Nov. 6, 1928.

L. F. CURTIS 1,690,569

OSCILLATOR SPRING

Filed Feb. 8, 1928

INVENTOR
Leslie F. Curtis
BY
HIS ATTORNEY

Patented Nov. 6, 1928.

1,690,569

UNITED STATES PATENT OFFICE.

LESLIE F. CURTIS, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK.

OSCILLATOR SPRING.

Application filed February 8, 1928. Serial No. 252,731.

This invention relates to torsion springs and more particularly to springs adapted for use in oscillating magnetos.

The object of this invention is to provide a torsion spring which shall be free of angular distortion or displacement upon expansion.

Previous types of springs twisted so badly due to the pressure on the offset ends that considerable friction developed. This friction made the recoil of the rotor uncertain and under some conditions the machine failed to operate.

This condition I have overcome by providing a helical spring having each of its free ends provided with an extension which extends transversely across and substantially perpendicular or at right angles to the helix.

In the accompanying drawing I have illustrated the preferred embodiment of my invention.

Throughout the drawing like reference characters indicate like parts.

Figure 1:
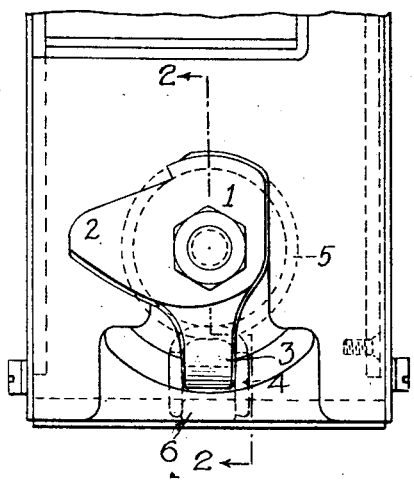
Fig. 1 is a front elevation of part of an inductor or magneto, with which this invention is concerned.
Figure 2:
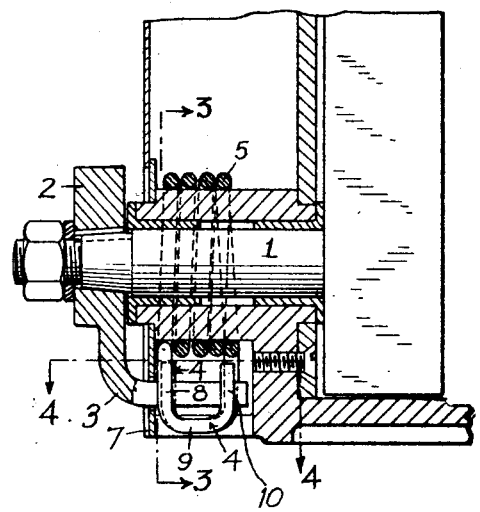
Fig. 2 is a transverse section through Fig. 1 on the line 2—2.
Figure 3:
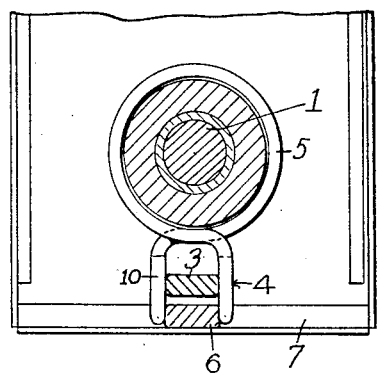
Fig. 3 is a front elevation of the helical spring as first manufactured.
Figure 4:
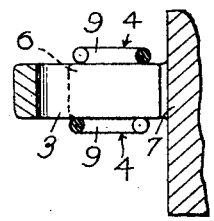
Fig. 4 is a transverse section on the line 4—4 of Fig. 2.
Figure 5:
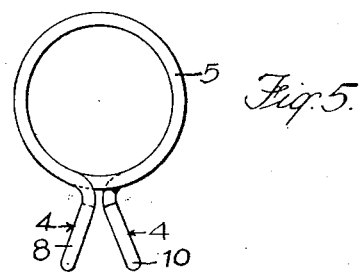
Fig. 5 is an end view of the oscillating spring as constructed before disposition in the assembled unit.

The inductor or magneto comprises an oscillating rotor 1, upon which is mounted a cam 2 having an inwardly extending lug 3 disposed between the ends or extensions 4 of the helical spring 5. A similar lug 6, attached to the stator or magneto frame 7, is disposed likewise between said ends 4.

In its inactive position, the extensions 4, 4 grip rather closely both the lugs on the stator and rotor, but as the rotor oscillates first one end and then the other end of the spring is drawn away by the rotor lug from the stator lug.

The extension 4, 4, it will be observed, is of U-shaped construction, and is specifically so formed for preventing angular distortion or displacement of the spring.

It has been found that where helical springs have merely a straight depending extension on opposite sides of the spring, there is a great amount of axial and lateral distortion or twisting of the spring which produces undesirable friction between it and the rotor shaft, resulting in lowering the efficiency of the magneto and even sometimes stopping it completely. I have found that if the depending extension is brought around to the other side of the spring, the distortion is prevented. This is due to the fact that the transverse portion opposes the twisting or lateral distortion of the spring.

Thus I have provided a helical spring which, besides having a straight depending portion 8, has a transverse portion 9, and an upwardly extending portion 10, the latter of which abuts against the rotor lug, as does also the depending portion 8, to oppose or compensate for distortion of the spring due to the rotor lug moving the depending portion 8 away from the axis of the spring.

More specifically the action of the spring is as follows: As the rotor lug moves away from the position of rest, it moves the depending portion 8 away from the axis of the helix. The upward portion 10 opposes the movement of the lug, but is nevertheless moved in the direction of the lug. In doing that, it pulls back the opposite end of the spring and this overcomes the distortion.

The transverse portion 9 engages the stator lug, and because of its extended engagement with the side of the lug, also tends to keep the spring from distorting.

Having described my invention, what I claim is:

1. A resilient member comprising a helical spring having its ends disposed transversely across the helix.

2. A resilient member comprising a helical spring each end of which is provided with a U-shaped extension disposed transversely across the helix.

3. A resilient member comprising a helical spring having opposed U-shaped extensions.

4. A resilient member comprising a helical spring having opposed ends disposed transversely across the helix.

5. The combination with an inductor having a stator and an oscillating rotor, of a helical spring having its ends disposed transversely across the helix and engaging said stator and rotor.

6. The combination with an inductor having a stator and an oscillating rotor, of a helical spring having U-shaped extensions disposed transversely across the helix and engaging said stator and rotor.

7. The combination with an inductor having a stator and an oscillating rotor, of a helical spring having opposed U-shaped extensions engaging said stator and rotor.

In testimony whereof I affix my signature.

LESLIE F. CURTIS.